(12) United States Patent
Jaff et al.

(10) Patent No.: US 9,697,548 B1
(45) Date of Patent: Jul. 4, 2017

(54) RESOLVING ITEM RETURNS OF AN ELECTRONIC MARKETPLACE

(71) Applicant: Amazon Technologies, Inc., Reno, NV (US)

(72) Inventors: Kosar Akram Jaff, Kirkland, WA (US); Shivkumar Shankaran, Issaquah, WA (US); Nitin Bhat, Seattle, WA (US); Kimberly Lee Daniels, Seattle, WA (US); Samuel Pike Hall, Seattle, WA (US); Nicholas John Morren, Seattle, WA (US); Raja Shekhar Goli, Hyderabad (IN); Prashant Agrawal, Secunderabad (IN); Sebastian Jorge Gunningham, Fall City, WA (US); Brian Jeffrey Saltzman, Seattle, WA (US); Tiana Osbourne Symmonds, Atlanta, GA (US); Debby Wing Yin Man, New York, NY (US)

(73) Assignee: Amazon Technologies, Inc., Reno, NV (US)

( * ) Notice: Subject to any disclaimer, the term of this patent is extended or adjusted under 35 U.S.C. 154(b) by 197 days.

(21) Appl. No.: 14/185,854

(22) Filed: Feb. 20, 2014

(51) Int. Cl.
G06Q 30/06 (2012.01)
G06Q 30/00 (2012.01)

(52) U.S. Cl.
CPC ....... *G06Q 30/0601* (2013.01); *G06Q 30/016* (2013.01)

(58) Field of Classification Search
CPC .......................................... G06Q 30/06–30/08
USPC ................................................ 705/26.1–27.2
See application file for complete search history.

(56) References Cited

U.S. PATENT DOCUMENTS

| 5,969,317 | A | * | 10/1999 | Espy | G06K 9/00 235/378 |
|---|---|---|---|---|---|
| 2002/0019785 | A1 | * | 2/2002 | Whitman | G06Q 10/087 705/28 |
| 2006/0114531 | A1 | * | 6/2006 | Webb | G01N 21/8806 359/15 |
| 2006/0136236 | A1 | * | 6/2006 | Horton | G06Q 10/08 705/330 |
| 2009/0138290 | A1 | * | 5/2009 | Holden | G06Q 10/087 705/4 |
| 2011/0087606 | A1 | * | 4/2011 | Hammond | G06Q 10/06 705/304 |

(Continued)

FOREIGN PATENT DOCUMENTS

WO WO 2012178047 A1 * 12/2012 ......... G06Q 10/0837

*Primary Examiner* — Ethan D Civan
*Assistant Examiner* — Ming Shui
(74) *Attorney, Agent, or Firm* — Kilpatrick Townsend & Stockton LLP

(57) ABSTRACT

Techniques for managing a return request may be provided. For example, a user may want to return an item that the user received from an item provider via an electronic marketplace. The user can take a picture of the item and transmit the image to a computer that determines that the user would like to return the item. The computer may also determine that the item is returnable (e.g., was provided to the user within an allowable timeframe, satisfies a constraint for returning the item). The computer can initiate a return of the item. In some examples, the computer can also determine a convenient return location or the reason that the user is returning the item to the item provider.

15 Claims, 9 Drawing Sheets

(56) References Cited

U.S. PATENT DOCUMENTS

2014/0278571 A1* 9/2014 Mullen ................. G06Q 40/08
                                                   705/4
2015/0278893 A1* 10/2015 Taylor ................ G06Q 30/0611
                                                   705/26.4

* cited by examiner

RESOLVING ITEM RETURNS OF AN ELECTRONIC MARKETPLACE

BACKGROUND

Many items are provided to users after an image of the item is exchanged. For example, a user can browse to an electronic marketplace to view an item. The user may determine that they want the item shown in the pictures and/or description, and request that the item provider provide the item to the user.

However, when the user receives and decides to return the item, the process is difficult and time consuming. For example, the user may traverse several steps to request the return (e.g., calling the item provider, browsing to the electronic marketplace to start a multi-step login and request process, etc.). Once the return is requested, the user may still have to print a shipping label, purchase a return box, and/or drop off the box at a shipping facility during the shipping facility's limited hours.

BRIEF DESCRIPTION OF THE DRAWINGS

Various embodiments in accordance with the present disclosure will be described with reference to the drawings, in which.

DETAILED DESCRIPTION

Figure 1:
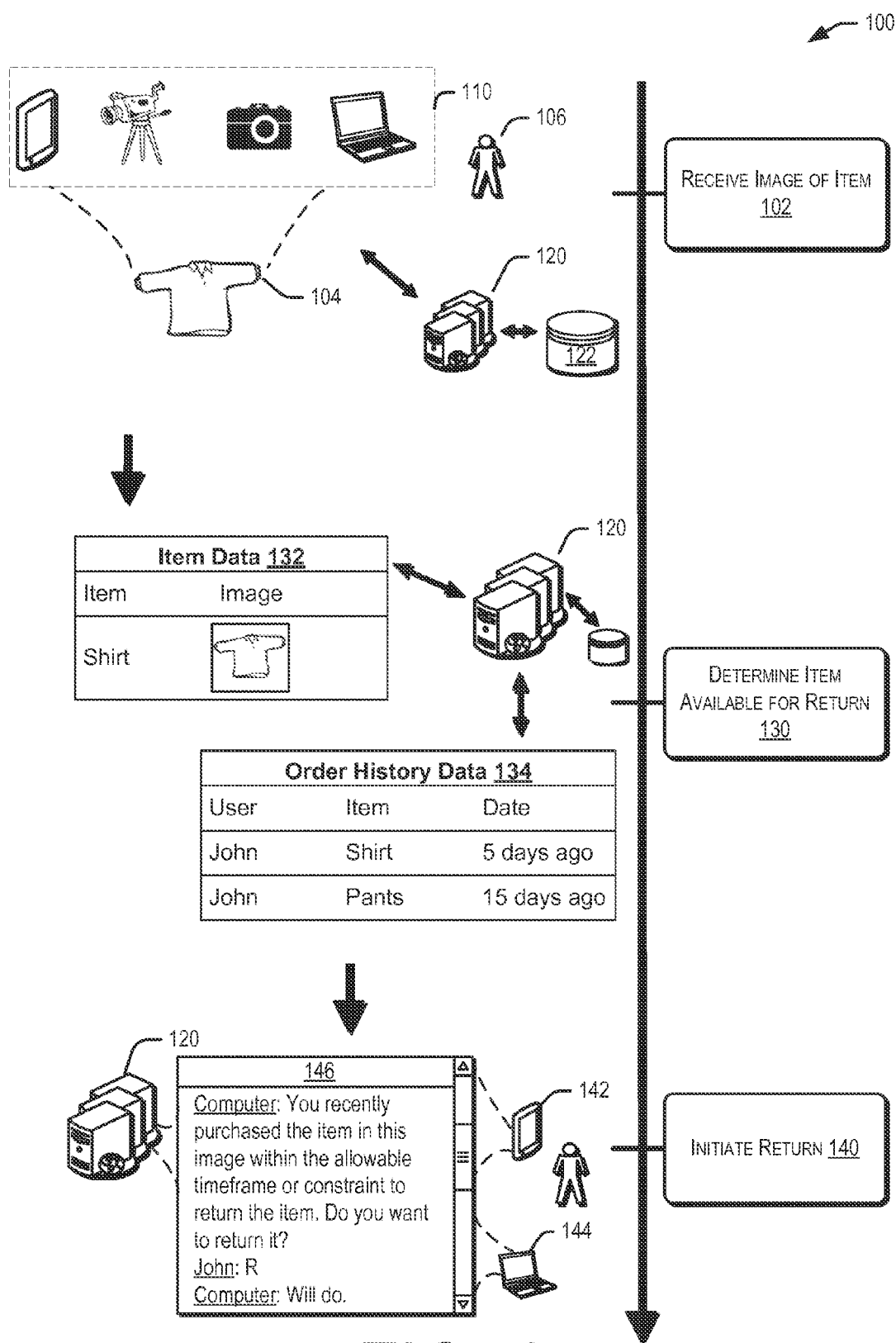
FIG. 1 illustrates an illustrative flow for managing a return request described herein, according to at least one example.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, a system for initiating a return of an item. For example, a user may want to return an item that the user received from an item provider via an electronic marketplace. The user can take a picture of the item and transmit the image to a computer that determines that the user would like to return the item. The computer may also determine that the item was provided to the user within an allowable timeframe for returning the item. The computer can initiate a return of the item. In some examples, the computer can also determine a convenient return location or the reason that the user is returning the item to the item provider.

In an illustrative example, the user captures an image of a shirt with their mobile device and transmits the image to a computer system of an electronic marketplace. The computer system identifies the user sending the image and the item shown in the image as a shirt that the user purchased 5 days earlier. The computer system determines that the user is attempting to initiate a return of the item by sending the picture. The computer system then initiates a return request for the item and/or a workflow for enabling the return of the item (e.g., convenient return locations close to the user, shipping destination(s), reasons why the item was returned) and provides the user with a return resolution (e.g., notification to the user that a refund for the item will be returned to the user on a gift or debit card).

A "return" may include giving back an item or restoring a status quo to before the item was provided to a user (e.g., exchanging money for a returned item). A return can be initiated after an item is provided by an item provider to a user. The return may include providing the same item to the item provider or to a third party (e.g., a return manager). In some examples, the item provider and third party may exchange the item, identify the other party of the status or location of the item, provide payment or credit in exchange for the item, or any other management or activity completed in association with a return process.

An "allowable timeframe" may include a particular duration of time determined by the item provider for when the item can be returned by the user. For example, an item provider may determine that the allowable timeframe is 30-days from the date that the user requested the item (e.g., purchased, bid on, requested delivery). In another example, the allowable timeframe may include a particular date, irrespective of the date the user requested the item (e.g., all returns accepted before January 1$^{st}$). In some examples, the allowable timeframe may vary by item, user, payment method, or other factors (e.g., final sale).

The allowable timeframe may be an example of a "constraint" that restricts or identifies when an item can be returned. For example, when the user does not provide the item for return within the allowable timeframe, the item may not be available to return. In another example, the timeframe for returning the item may be unrestricted by a particular timeframe (e.g., a lifetime return policy). In yet another example, the item may be returned in exchange for another item, so the constraint may include possessing the particular item for return or surrendering the item around the time of the requested return. The constraint may be based on an identification of whether the item is returnable (e.g., based on cost, constraints associated with returning the item within a certain geographic area, constraints imposed by the item provider, etc.)

A "workflow" may include one or more events or actions taken during a return. For example, in order to get the item from the user to a return location, the workflow may identify one or more available return locations, whether any of the available return locations are convenient return locations for a user, whether a box and/or label is needed, or any convenient time that the user would be able to provide the item to the return location. In another example, in order to get the item from the return location to the item provider, the workflow may identify one or more available delivery times for a shipping service to pick up the item at the return location, schedule a pick up time with the shipping service, identify where the item is after the shipping service retrieves the item, when the shipping service drops off the item at an item provider, return center, or shipping hub, determining a return resolution, or any other information that may be relevant when returning the item.

FIG. 1 illustrates an illustrative flow for managing a return request described herein, according to at least one example. In a non-limiting example, the method 100 can receive an image of an item 102. For example, the item 104 can be an item (e.g., shirt, pants, electronics, home goods) provided by an item provider to a user 106. The image may an image in various standards or image formats, including a Joint Photographic Expert Group (JPEG) standard, a portable network graphics (PNG) standard, graphic interchange format (GIF), bitmap (BMP) image format, or any other encoding and/or compression standards.

One or more user devices 110 may be used to capture an image of the item 104. For example, the user device 110 can be any type of computing device including a mobile phone, a smart phone, a personal digital assistant (PDA), a laptop computer, a desktop computer, a thin-client device, a tablet PC, an electronic book (e-book) reader, camera, motion picture device, scanner, etc. In another example, the user device 110 can be an image recognition device with machine vision (e.g., eyeglasses with a camera, an automobile camera, a mobile phone with camera, etc.). The image can be transmitted to a computer system 120, such that the computer system 120 is configured to receive the image from the device. In some examples, the computer system 120 can store the image in a data store 122.

The computer system 120 can identify the item in the image. The image may include an identifier of the item or portion of the item. The identifier can include a barcode, item identifier, alphanumeric representation associated with the item, or other easily transferrable and recognizable representation (e.g., via optical character recognition (OCR)) of the item.

In some examples, the image can include an identifier of at least a portion of the item using a characteristic of the item. For example, the shirt shown in the image may include a particular fabric, cut, design, lapel, epilates, or other design feature that identifies the shirt. In another example, a mobile device shown in the image can include a particular screen size, button layout, color case, dimensions, or other design features that identify the mobile device.

In some embodiments, the image including the identifier of at least a portion of the item can be compared with a stock image or item data 132. For example, the computer system 120 can retrieve the stock image from the data store 122, compare the stock image with the received image, and determine that the received image is associated with the stock image. In some examples, the stock image can be associated with additional information (e.g., item provider, item identifier, year of manufacture, origin of manufacture) that may not be visible in the image. When the corresponding stock image is identified, the item data 132 for the stock image can be associated with the received image, so that the source of the item data is from the stock image and not from the information in the image or from the user. In some embodiments, the computer system 120 can determine the item identifier associated with the received image based at least in part on a portion of the compared stock image.

The image can be received from an electronic notification from the user. For example, the user can transmit the image using a user device to provide the electronic notification.

The electronic notification can include the image or identifying information for the user providing the image. The electronic notification may comprise a variety of formats, including, for example, a text message, functional call, or network document request.

In some examples, the received image can be associated with a user. For example, the user device that transmits the image can be associated with an identifier (e.g., electronic serial number (ESN), international mobile equipment identity (IMEI), mobile equipment identifier (MEID), user name, phone number, subscriber identifier (IMSI), device carrier). In another example, the user may provide a user identifier to the computer system 120 to identify the origin of the image.

In some examples the user can be identified by the user's location. For example, a determination can be made that the item was provided to the user. The determination may include identifying a first location of the user that corresponds with a second location where the item was provided.

Once the user is identified, the user can be associated with a user's order history. For example, the data store 122 can store information associated with the items that the user was previously provided. The order history data 134 can include item identifiers, item providers, users that were provided with the particular items, the allowable timeframe to return the items, or other relevant information. The order history data 134 can be sorted, filtered, aggregated, or archived as well.

The method 100 may determine if the item is available to return 130. For example, the determination may consider whether the item was provided within an allowable timeframe or whether the request to return the item satisfies some constraint for returning the item (e.g., the user agrees to surrender the item in exchange for another item, if the item is returnable based on cost, or the return satisfies particular constraints associated with returning the item in a certain geography or constraints imposed by the item provider, etc.). For example, once the computer system 120 determines the user, identifier of the item shown in the image, and the allowable timeframe for returning the particular item, the computer system 120 can determine that the item was provided to the user within the allowable timeframe for returning the item to the item provider. For example, if the item was provided to the user on January $1^{st}$, the allowable timeframe for returning the item is 5 days, and the computer system 120 receives the image of the item on January $3^{rd}$, the computer system 120 can determine that the user is initiating a return of the item to the item provider because the request to return the item is within the allowable timeframe for returning the item. In another example, if the item was provided to the user on December $30^{th}$, the allowable timeframe for returning the item is January $1^{st}$ (e.g., the last date to return the item), and the computer system 120 receives the image of the item on January $3^{rd}$, the computer system 120 can determine that the user is initiating a return of the item to the item provider, even though the initiation is outside of the allowable timeframe (e.g., the computer system may inform the user that the initiation is outside of the allowable timeframe for returning the item). In yet another example, if the item was not provided to the user (e.g., the item is identified by an identifier, but does not appear in the user's order history data 134), the item was provided substantially outside of the allowable timeframe when compared with the current date (e.g., 6 months), or other reasons, the computer system 120 may not determine that the user is initiating a return of the item to the item provider.

In some embodiments, the system may determine that the item is returnable by satisfying a constraint. For example, the constraint may include cost. The item may be returnable if the cost of the return is below a particular cost (e.g., identified by an item provider or server). In another example, the constraint may include whether the item is returnable in a certain geography (e.g., returns required within 61 days in Germany) or constraints imposed by the item provider (e.g., returns required in the original packaging, returns allowed if the dimensions of the item are under a particular threshold, etc.).

The method 100 may initiate a return 140. For example, the computer system 120 can confirm that the user is initiating a return of the item. The computer system 120 can query the user via a network page, text message, email communication, or other network document 146. The query can include "you recently purchased the item in this image within the allowable timeframe to return the item. Do you want to return it?" In another example, the query can include "you purchased this item and the item is available for return under the lifetime return policy. Would you like to return it?"

The user can confirm that they are initiating a return of the item. For example, the user can operate a user device, including a mobile device 142 (e.g., for text or short message service (SMS) message) or desktop/laptop computer 144 to respond to the query. In some examples, the user may simply respond "R" (e.g., return, request) or some other response recognizable by the computer system 120 as confirm the user's intention to initiate the request (e.g., "yes," "go," "proceed"). In other examples, the user device can be an image recognition device with machine vision (e.g., eyeglasses with a camera, automobile camera, mobile phone with camera, etc.) that can respond through motion (e.g., nodding a user's head yes or no) or a verbal communication.

In some examples, the computer system 120 can identify steps in the return process as part of the workflow or return request. For example, the computer system 120 can identify a workflow. The workflow may include one or more events or actions taken during a return. For example, in order to get the item from the user to a return location, the workflow may identify one or more available return locations, whether any of the available return locations are convenient return locations for a user, whether a box and/or label is needed, or any convenient time that the user would be able to provide the item to the return location. In another example, in order to get the item from the return location to the item provider, the workflow may identify one or more available delivery times for a shipping service to pick up the item at the return location, schedule a pick up time with the shipping service, identify where the item is after the shipping service retrieves the item, when the shipping service drops off the item at an item provider, return center, or shipping hub, or any other information that may be relevant when returning the item.

In some examples, the workflow can include steps related to shipping and/or inventory information. For example, the workflow may include determining a shipping destination and/or providing shipping information (e.g., including the shipping destination). Determining a shipping destination may be identified in response to initiating the return request. In another example, the initiation of the workflow can include updating inventory information that identifies the item.

The user may be notified of one or more parts of the workflow or return process. For example, the computer system 120 can transmit one or more recommended return locations to the user, inform the user when the item is retrieved from a return location, or inform the user when the item is received at the item provider.

The user may also be provided with a return resolution. For example, the workflow or return process can identify that the user would like to receive funds for the returned item to a gift card, credit card, or cash. In some examples, the workflow or return process can identify that the item can be replaced or exchanged with an alternative or similar item associated with the return item (e.g., the same model, the newer model). In some examples, the workflow or return process can identify a replacement item to provide to the user, including an item from a virtual shopping cart, a wish list (e.g., a list of items that the user has identified that they would like to receive in the future), or other items identified by the user.

In some examples, the user's current location can be incorporated with the workflow or return process. For example, the computer system 120 can determine a current location of the user (e.g., 1 Main Street). The one or more recommended return locations can be ranked based in part on the current location. For example, the one or more recommended return locations are ranked based at least in part on the distance between the current location of the user and a work location, or the distance between the current location of the user and a home location.

The user's preferences may also be incorporated with the workflow or return process. For example, when the user prefers to drop off items at the closest Fed-Ex® store to their work location, the address of their work location, address of the Fed-Ex® store location, and the specified preference can be associated with the user (e.g., similar to the user's order history stored in order history data 134). In some examples, the user's travel pattern may be considered as well, as discussed in relation to FIG. 3.

Figure 2:
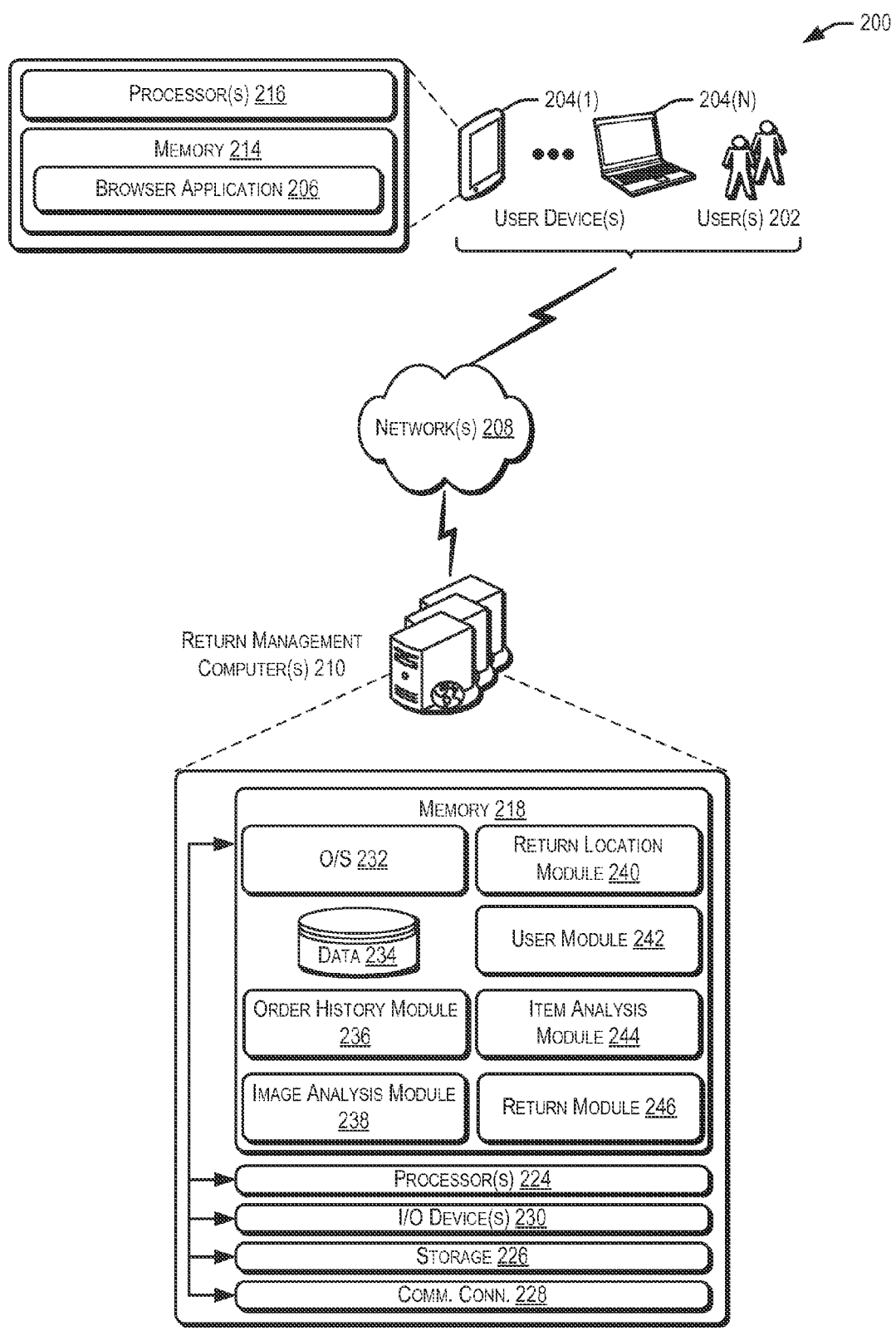
FIG. 2 illustrates an example architecture for managing returns described herein that includes a return management computer and/or a user device connected via one or more networks, according to at least one example.

FIG. 2 illustrates an example architecture for managing returns described herein that includes a return management computer and/or a user device connected via one or more networks, according to at least one example. In architecture 200, one or more users 202 (i.e., web browser users) may utilize user computing devices 204(1)-(N) (collectively, user devices 204) to access an application 206 (e.g., a web browser), via one or more networks 208. In some aspects, the application 206 may be hosted, managed, and/or provided by a computing resources service or service provider, such as by utilizing one or more service provider computers and/or one or more return management computers 210. The one or more return management computers 210 may, in some examples, provide computing resources such as, but not limited to, client entities, low latency data storage, durable data storage, data access, management, virtualization, cloud-based software solutions, electronic content performance management, etc. The one or more return management computers 210 may also be operable to provide web hosting, computer application development, and/or implementation platforms, combinations of the foregoing, or the like to the one or more users 202. The one or more return management computers 210, in some examples, may provide electronic return management of items.

In some examples, the networks 208 may include any one or a combination of many different types of networks, such as cable networks, the Internet, wireless networks, cellular networks and other private and/or public networks. While the illustrated example represents the users 202 accessing the application 206 over the networks 208, the described techniques may equally apply in instances where the users 202 interact with the return management computers 210 via the one or more user devices 204 over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

As described briefly above, the application 206 may allow the users 202 to interact with a service provider computer, such as to access web content (e.g., web pages, music, video, etc.). The one or more return management computers 210, perhaps arranged in a cluster of servers or as a server farm, may host the application 206 and/or cloud-based software services. Other server architectures may also be used to host the application 206. The application 206 may be capable of handling requests from many users 202 and serving, in response, various item web pages. The application 206 can provide any type of website that supports user interaction, including social networking sites, online retailers, informational sites, blog sites, search engine sites, news and entertainment sites, and so forth. As discussed above, the described techniques can similarly be implemented outside of the application 206, such as with other applications running on the user devices 204.

The user devices 204 may be any type of computing device such as, but not limited to, a mobile phone, a smart phone, a personal digital assistant (PDA), a laptop computer, a desktop computer, a thin-client device, a tablet PC, an electronic book (e-book) reader, etc. In some examples, the user devices 204 may be in communication with the return management computers 210 via the networks 208, or via other network connections. Additionally, the user devices 204 may be part of the distributed system managed by, controlled by, or otherwise part of the return management computers 210 (e.g., a console device integrated with the return management computers 210).

In one illustrative configuration, the user devices 204 may include at least one memory 214 and one or more processing units (or processor(s)) 216. The processor(s) 216 may be implemented as appropriate in hardware, computer-executable instructions, firmware, or combinations thereof. Computer-executable instruction or firmware implementations of the processor(s) 216 may include computer-executable or machine-executable instructions written in any suitable programming language to perform the various functions described. The user devices 204 may also include geo-location devices (e.g., a global positioning system (GPS) device or the like) for providing and/or recording geographic location information associated with the user devices 204.

The memory 214 may store program instructions that are loadable and executable on the processor(s) 216, as well as data generated during the execution of these programs. Depending on the configuration and type of user device 204, the memory 214 may be volatile (such as random access memory (RAM)) and/or non-volatile (such as read-only memory (ROM), flash memory, etc.). The user device 204 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 214 may include multiple different types of memory, such as static random access memory (SRAM), dynamic random access memory (DRAM), or ROM.

Turning to the contents of the memory 214 in more detail, the memory 214 may include an operating system and one or more application programs or services for implementing the features disclosed herein, such as via the browser application 206 or dedicated applications (e.g., smart phone applications, tablet applications, etc.). The browser application 206 may be configured to receive, store, and/or display a website or other interface for interacting with the return management computers 210. Additionally, the memory 214 may store access credentials and/or other user information such as, but not limited to, user IDs, passwords, and/or other user information. In some examples, the user information may include information for authenticating an account access request such as, but not limited to, a device ID, a cookie, an IP address, a location, or the like. In addition, the user information may include a user 202 provided response to a security question or a geographic location obtained by the user device 204.

In some aspects, the return management computers 210 may also be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider computers are executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment. In some examples, the return management computers 210 may be in communication with the user devices 204 and/or other service providers via the networks 208, or via other network connections. The return management computers 210 may include one or more servers, perhaps arranged in a cluster, as a server farm, or as individual servers not associated with one another. These servers may be configured to implement the content performance management described herein as part of an integrated, distributed computing environment.

In one illustrative configuration, the return management computers 210 may include at least one memory 218 and one or more processing units (or processor(s)) 224. The processor(s) 224 may be implemented as appropriate in hardware, computer-executable instructions, firmware, or combinations thereof. Computer-executable instruction or firmware implementations of the processor(s) 224 may include computer-executable or machine-executable instructions written in any suitable programming language to perform the various functions described.

The memory 218 may store program instructions that are loadable and executable on the processor(s) 224, as well as data generated during the execution of these programs. Depending on the configuration and type of return management computers 210, the memory 218 may be volatile (such as RAM) and/or non-volatile (such as ROM, flash memory, etc.). The return management computers 210 or servers may also include additional storage 226, which may include removable storage and/or non-removable storage. The additional storage 226 may include, but is not limited to, magnetic storage, optical disks and/or tape storage. The disk drives and their associated computer-readable media may provide non-volatile storage of computer-readable instructions, data structures, program modules and other data for the computing devices. In some implementations, the memory 218 may include multiple different types of memory, such as SRAM, DRAM, or ROM.

The memory 218, the additional storage 226, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 218 and the additional storage 226 are all examples of computer storage media. Additional types of computer storage media that may be present in the return management computers 210 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the return management computers 210. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The return management computers 210 may also contain communications connection(s) 228 that allow the return management computers 210 to communicate with a stored database, another computing device or server, user terminals and/or other devices on the networks 208. The return management computers 210 may also include I/O device(s) 230, such as a keyboard, a mouse, a pen, a voice input device, a touch input device, a display, speakers, a printer, etc.

Turning to the contents of the memory 218 in more detail, the memory 218 may include an operating system 232, one or more data stores 234, and/or one or more application programs or services for implementing the features disclosed herein including an order history module 236, an image analysis module 238, a return location module 240, a user module 242, an item analysis module 244, and/or a return module 246. In some examples, the order history module 236 may be configured to determine whether an item was provided by the item provider. For example, an item identifier associated with an item (e.g., barcode, item code, item description, characteristic of the item) can be compared with the identifiers of items provided by an item provider to a user. When the identifier is included in the order history for the user, the item may have been provided by the item provider to the user. In some examples, the item provider may identify the provided items.

The order history module 236 may also be configured to determine whether an item was provided through an electronic marketplace. For example, an identifier associated with an item (e.g., barcode, item code, item description, characteristic of the item) can be compared with the identifier(s) of the items provided by the item provider in an electronic marketplace. In some examples, the item may not be associated with a particular item provider, but still provided in the electronic marketplace.

The order history module 236 may also be configured to determine a timeframe and/or allowable timeframe. For example, the computer system may associate the time when the return is initiated as the current time. The allowable timeframe may be calculated or identified based on the current time. For example, the "allowable timeframe" may include a particular duration of time determined by the item provider for when the item can be returned by the user. For example, an item provider may determine that the allowable timeframe is 30-days from the date that the user requested the item (e.g., purchased, bid on, requested delivery). In another example, the allowable timeframe may include a particular date, irrespective of the date the user requested the item (e.g., all returns accepted before January $1^{st}$). The order history module 236 may interact with other modules to the item provider's defined allowable timeframe(s) for items, including the user module 242.

The order history module 236 may also be configured to determine whether the return request is allowed based on a constraint that restricts an item from being returned. For example, when the user does not provide the item for return within the allowable timeframe, the item may not be available to return. In another example, the timeframe for returning the item may not be restricted by a particular timeframe (e.g., a lifetime return policy of an item provider). In yet another example, the item may be returned in exchange for another item, so the constraint may include possessing the particular item for return or surrendering the item at the time of the requested return. The order history module 236 may interact with an item analysis module 244 to determine whether the item can be returned (e.g., the item can be returned based on the country to return, the type of item to return, or rules/policies associated with the item provider that provided the item).

The memory 218 may also include an image analysis module 238. The image analysis module 238 may be configured to receive at least a portion of an image. For example, a user device 204 can transmit the image via a network 208 to the return management computer 210. The return management computers 210 can receive at least a portion of the image. In some embodiments, the return management computers 210 can store the image as well (e.g., in a data store 234).

The image analysis module 238 may also be configured to identify an item by an identifier. For example, the image analysis module 238 can identify a portion of the image (e.g., via optical character recognition (OCR)) as the identifier (e.g., the top left portion of the image, substantially the entire image).

The identifier may include any type of identifier. For example, the identifier may be a barcode or alphanumeric identifier that provides a machine-readable image/code that can be associated with an identification of an item. The barcode or alphanumeric code can be associated with the item (e.g., a tag attached to the item, a tag printed on the item, non-removable printed identifier embedded with the item). In another example, the identifier may be a characteristic of an item. For example, the shirt shown in the image may include a particular fabric, cut, design, lapel, epilates, or other design feature that identifies the shirt. In another example, a mobile device shown in the image can include a particular screen size, button layout, color case, dimensions, or other design features that identify the mobile device. The computer may compare a stock image with the received image to identify the item included in the image. The stock image may be associated with an identifier that the image analysis module 238 can then associate with the received image.

The image analysis module 238 may also be configured to determine a reason for the return. For example, the user may return the item because the item is damaged. When the image analysis module 238 compares the stock image with the received image, the image analysis module 238 can identify the damaged portion of the item identified in the image (e.g., chipped glass, torn pages, missing buttons, broken zippers, discolored plastics, etc.). The image analysis module 238 may store the reason for the return request in a data store. The image analysis module 238 may interact with other modules to receive additional information about an item and/or a stock image, including the item analysis module 244.

The image analysis module 238 may also be configured to identify a stock image. For example, before determining that the item should be returned to the item provider, the image analysis module 238 can compare at least a portion of a stock image with the received image and determine that a stock image is associated with the received image. The stock image and the received image may be associated with the same identifier. A stock image can include one or more images of an item provided by the item manufacturer, item provider, electronic marketplace, third party users, or any other source of images. The stock image may depict the item as the item is new and/or unused, so that any damage from the shipping, delivery, or use of the item can be identified in comparison to received images. In some examples, multiple stock images may be compared with the received image to appropriately identify the item included in the received image.

The memory 218 may also include a return location module 240. The return location module 240 may also be configured to receive available return locations. For example, the available return locations may include shipping locations, merchandise locations, convenience locations, user's home or office building, or any other identifiable location for providing an item to return (e.g., Starbucks®, 7-Eleven®, Fed-Ex®, UPS®, United States Postal Service location). The available return locations can include hours of operation, item characteristics that the return location can manage (e.g., nothing over 20 pounds, nothing bio-hazardous or perishable).

The return location module 240 may also be configured to determine return locations. For example, when a return location is a user's home, the return location module 240 may identify that the user lives at 100 Main Street from the information that the user provided to a shipping profile. In another example, when the return location is a Starbucks®, the return location module 240 can identify that the Starbucks® return location is stored in a particular data store and the address is retrieved from the data store to associate with the return location.

In some embodiments, the return location module 240 may also be configured to rank the return locations. For example, when one potential return location is 0.3 miles from a user's home and a second potential return location is 1.2 miles from a user's home, the return location module 240 can rank the locations provided. For example, the home of the user may be first in a list of potential return locations, the potential return location located 0.3 miles from the user's home may be second in the list of potential return locations, and the potential return location located 1.2 miles from a user's home may be third.

The return location module 240 may be configured to receive a travel pattern. For example, the travel pattern may include a user's potential locations at a particular time or day, including 1 Main Street at 6 AM, on the 5-Freeway toward Downtown between 8 AM and 9 AM, at 500 Downtown Way between 9 AM and 5 PM, and so on. The travel pattern can be identified as a weekday or weekend travel pattern, monthly travel pattern, or various other timeframes (e.g., every January in California, every July in Washington).

The return location module 240 may also be configured to receive user preferences. The user preferences can include preferred return locations (e.g., next to work in the morning, next to home at night), preferred shipping methods (e.g., next day air, ground shipping), preferred pickup locations, convenient times, or other preferences relating to return locations. The return location module 240 may interact with other modules to receive user preferences, including the user module 242.

The return location module 240 may also be configured to interact with the user module 242 to identify a current location of the user. For example, the user module 242 may configured to identify a current location of a user and provide the current location to the return location module 240. The return location module 240 may utilize the information to identify one or more return locations that are close to the user at a particular time (e.g., the current location of the user).

In some embodiments, the return location module 240 may also be configured to rank the recommended return locations. For example, the rank can be based at least in part on the distance between the current location of the user and a work location, or the distance between the current location of the user and a home location (e.g., closest first).

The memory 218 may also include a user module 242. The user module 242 may be configured to receive an identification of a user. For example, the identification of a user can include the user device identifier or user identifier (e.g., electronic serial number (ESN), international mobile equipment identity (IMEI), mobile equipment identifier (MEID), user name, phone number, subscriber identifier (IMSI), device carrier).

The user module 242 may also be configured to receive an identification of an item provider. For example, the identification of the item provider may include the item provider's user name, item provider identifier, or other information associated with an item provider. In some examples, the user module 242 may also be configured to identify related information with an item provider, including inventory, order/providing history, or item information of items offered or provided to one or more users.

In some embodiments, the user module 242 may identify a return policy of the item provider, including an allowable timeframe for returning the item to the item provider and/or a third party or a constraint associated with allowing the item to be returned. For example, an item provider may determine that the allowable timeframe is 30-days from the date that the user requested the item (e.g., purchased, bid on, requested delivery). In another example, the allowable timeframe may include a particular date, irrespective of the date the user requested the item (e.g., all returns accepted before January $1^{st}$).

The user module 242 may also be configured to receive a request to return an item. For example, the return can be requested based at least in part on an electronic notification received from the user, including a short message service (SMS), e-mail, or via other communication channel. In another example, the electronic notification comprises a text message, function call (e.g., via an application programming interface (API)), or a network document request (e.g., web page, network page). The request to return the item may also include an identifier of the item, user, or item provider. In some examples, the request to return the item may not be stated as a request, but rather as providing an image of the item, determining that the item was provided to the user within the allowable timeframe, and initiating a return of the item to the item provider independent of receiving a request from the user to return the item.

The user module 242 may also be configured to identify a return resolution for a user. For example, the user may be asked what they would like to receive for returning the item via the user device (e.g., cash, a gift card, a statement credit, a deposit, a replaced item, an exchanged item, etc.). In some examples, the user may provide the preferred return resolution via a profile or proactively, so that the user module 242 identifies the return resolution for the user based on saved information about the user.

The user module 242 may also be configured to identify a location of a user. For example, the current location of the user may be identified by a global positioning system (GPS) location of a user device that the user may have with them. In another example, the current location may be based at least in part on the user's travel pattern. For example, when the current location of the consumer is queried at 3 PM and the travel pattern for the user shows that the user should be located at 500 Downtown Way between 9 AM and 5 PM, the user module 242 can identify the current location as 500 Downtown Way. In some examples, the user may identify their current location (e.g., "I am at 500 Downtown Way").

In some embodiments, the user module 242 may also be configured to identify a first location of the user that corresponds to a second location where the item was provided. This may help determine whether the returning user is the same user as the user that received the provided item (e.g., the purchasing user, the ordering user, the requesting user). For example, when the user's home location is at 1 Main Street and the item was provided at 1 Main Street, the user module 242 can identify that the item was provided to the user that is associated with 1 Main Street (e.g. work, home, school, a profile location, a current location, location(s) in the travel pattern, etc.).

The memory 218 may also include an item analysis module 244. The item analysis module 244 may be configured to identify characteristics of an item. The characteristics can include weight, dimensions, whether the item contains particular shipping requirements (e.g., bio-hazard, kept upright), or other characteristics that can affect how, why, or when an item can be provided to another location.

The item analysis module 244 may also be configured to identify a shipping method based in part on the characteristics of the item. For example, a large trunk with a forklift may be needed to return a refrigerator. The shipping method may identify the type of truck, available pickup times for the truck, local drivers to the return location, or other related information.

The item analysis module 244 may also be configured to identify at least a portion of the item. For example, the image can contain at least a portion of the item, including an item identifier. The item analysis module 244 can interact with the image analysis module 238 to identify the identifier of the item in the image and further determine item information for that item (e.g., an item description, a price, dimensions, an item provider, when the item was provided, ordered, or requested, etc.).

The memory 218 may also include a return module 246. The return module 246 may be configured to generate a return request or workflow. For example, the return request can include information to initiate a return (e.g., convenient return locations close to the user, shipping destination(s), reasons why the item was returned, return resolution in response to the received item). A return request may also include an image of an item that the user would like to return. In some examples, the return request may be initiated if it is determined that the item was provided to a user within an allowable timeframe based at least in part on the identified item.

The return module 246 may also be configured to generate a workflow. The workflow may include a return request. The workflow can include one or more events or actions taken during a return process. For example, in order to get the item from the user to a return location, the workflow may identify one or more available return locations, whether any of the available return locations are convenient return locations for a user, whether a box and/or label is needed, or any convenient time that the user would be able to provide the item to the return location. In another example, in order to get the item from the return location to the item provider, the workflow may identify one or more available delivery times for a shipping service to pick up the item at the return location, schedule a pick up time with the shipping service, identify where the item is after the shipping service retrieves the item, when the shipping service drops off the item at an item provider, return center, or shipping hub, or any other information that may be relevant when returning the item. In some examples, the workflow may be initiated if it is determined that the item was provided to a user within an allowable timeframe based at least in part on the identified item.

The return module 246 may also be configured to identify whether the user is initiating a return of the item to the item provider. For example, if the item was provided to the user on January $1^{st}$, the allowable timeframe for returning the item is 5 days, and the return management computers 210 receives the image of the item on January $3^{rd}$, the return management computers 210 can determine that the user is initiating a return of the item to the item provider because the request to return the item is within the allowable timeframe for rating the item. In another example, if the item was provided to the user on December $30^{th}$, the allowable timeframe for returning the item is January $1^{st}$ (e.g., the last date to return the item), and the return management computers 210 receives the image of the item on January $3^{rd}$, the return management computers 210 can determine that the user is initiating a return of the item to the item provider, even though the initiation is outside of the allowable timeframe (e.g., the computer system may inform the user that the initiation is outside of the allowable timeframe for returning the item). In yet another example, if the item was not provided to the user (e.g., the item is identified by an identifier, but does not appear in the user's order history data 134), the item was provided substantially outside of the allowable timeframe when compared with the current date (e.g., 6 months), or other reasons, the return management computers 210 may not determine that the user is initiating a return of the item to the item provider.

The return module 246 may also be configured to incorporate return locations with a workflow. For example, in order to get the item from the user to a return location, the workflow may identify one or more available return locations, whether any of the available return locations are convenient return locations for a user, whether a box and/or label is needed, or any convenient time that the user would be able to provide the item to the return location. In some embodiments, the return module 246 may interact with other modules, including a return location module 240, to identify potential return locations available to accept the return.

The return module 246 may also be configured to generate a confirmation of a return or a workflow. For example, the return module 246 can transmit an electronic notification to a user and/or item provider to inform the user and/or item provider of the progress of the return or workflow (e.g., when the item arrives at the shipping location or item provider). The confirmation may include a return resolution that identifies what the user can receive for returning the item.

The return module 246 may also be configured to manage inventory. For example, when the item is provided to a return location, the inventory for an item provider may reflect the status of the item at the return location. The inventory may forecast the items available for the item provider to offer to other users. In some examples, the inventory management may include payments, credit, or other information associated with the changed inventory status.

The return module 246 may also be configured to determine a shipping destination. For example, the shipping destination can include the location where the item should be located after the item is provided to the return location. This can include a return warehouse, shipping vehicle, holding center, third party, or item provider.

The return module 246 may also be configured to determine a return resolution. For example, the workflow or return process can identify that the user would like to receive funds for the returned item to a gift card, credit card, or cash. In some examples, the workflow or return process can identify that the item can be replaced or exchanged with an alternative or similar item associated with the return item (e.g., the same model, the newer model). In some examples, the workflow or return process can identify a replacement item to provide to the user, including an item from a virtual shopping cart, a wish list (e.g., a list of items that the user has identified that they would like to receive in the future), or other items identified by the user.

Figure 3:
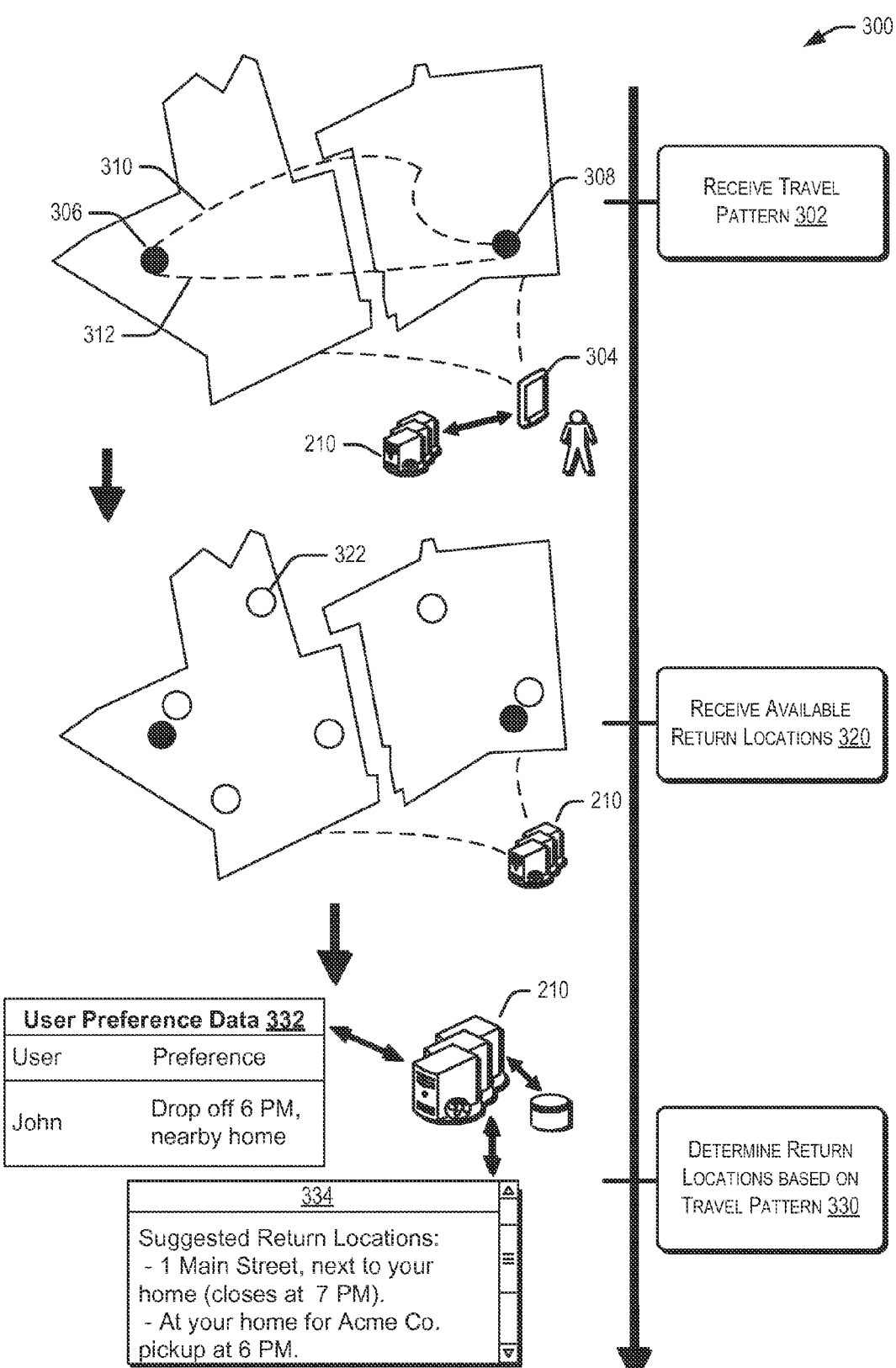
FIG. 3 illustrates an illustrative flow for managing a return request described herein, according to at least one example.

FIG. 3 illustrates an illustrative flow for managing a return request described herein, according to at least one example. For example, the user and/or computer system may initiate a return request to return an item to an item provider. The request may be initiated after receiving an image of at least a portion of the item, receiving an identifier of the item, receiving an electronic notification to initiate a return of the item, or other means of initiating a return request to return the item.

The method 300 can include receiving a travel pattern 302. The travel pattern may correspond with the user that received the item. For example, the return management computers 210 can interact with a user device 304 associated with a user to determine identifying information for the user and/or the user's order history. The order history may confirm that the item identified by the image is associated with a particular user and also a particular travel pattern for a particular user.

The travel pattern can include a plurality of estimated time-location pairs associated with the user, including a first location 306 and a second location 308. The locations can identify one or more locations that the user is customarily located during particular times of the day or days, including home, work, childcare, school, shopping, meetings, gym, friends, or other standardly frequented locations by the user. The locations can be provided by the user (e.g., a list of frequent/favorite locations) or received by the return management computers 210 (e.g., GPS locations, identified check-in locations, passive location submission information from the user device).

The travel pattern may also include one or more paths 310, 312. A path may be the route that the user takes to travel from one location to the next location (e.g., freeways, streets, sidewalks, airports, ferries). For example, the path 310, 312 between a first location 306 and second location 308 can include one or more stops, a direct route, or a non-stop path to get between a first location 306 and second location 308.

In some examples, the travel pattern can rank the particular return locations. For example, the travel pattern can include a plurality of estimated time-location pairs associated with the user. When the travel pattern identifies the user at 1 Main Street, and the return is initiated when the user is at 1 Main Street (e.g., based on GPS, travel pattern estimation), a time-location pair may be established (e.g., at the current time, the user is located at 1 Main Street). The return location closest to the particular location maybe ranked higher based at least in part on one or more estimated time-location pairs.

In some examples, the return locations can be ranked or filtered based in part on a user's preference. For example, when the user prefers dropping off an item to return by 6 PM nearby their home, the return management computers 210 can store the user preference in a user preference data store 332. The potential return locations that do not meet the user preferences (e.g., closed by 6 PM) can be removed or filtered from the list. The list may be ranked (e.g., proximity, preference, amenities).

The method 300 can receive available return locations 320. The return locations 322 can be configured to accept the item for return. In some examples, the available return locations 322 can provide resources, supplies, or amenities to help the user return the item, including a drop off location, locker, customer service representative, mailbox, or other location identified as a potential return location or service.

The method 300 can determine one or more suggested return locations of the available return locations based at least in part on the travel pattern 330. For example, the available return locations may include locations that are more than 2 miles from a first location 306, a second location 308, or path 310, 312 between the first location 306 and second location 308. These return locations may be filtered or removed from the potential list of suggested return locations. In another example, the available return locations may be removed or filtered if the return location is too busy, understaffed, or otherwise cannot accept new returns.

The one or more suggested return locations 334 can be transmitted to the user. For example, the transmission may include the ranked list of one or more suggested return locations, based in part on user preferences, travel pattern, the user's current location, or other information.

Figure 4:
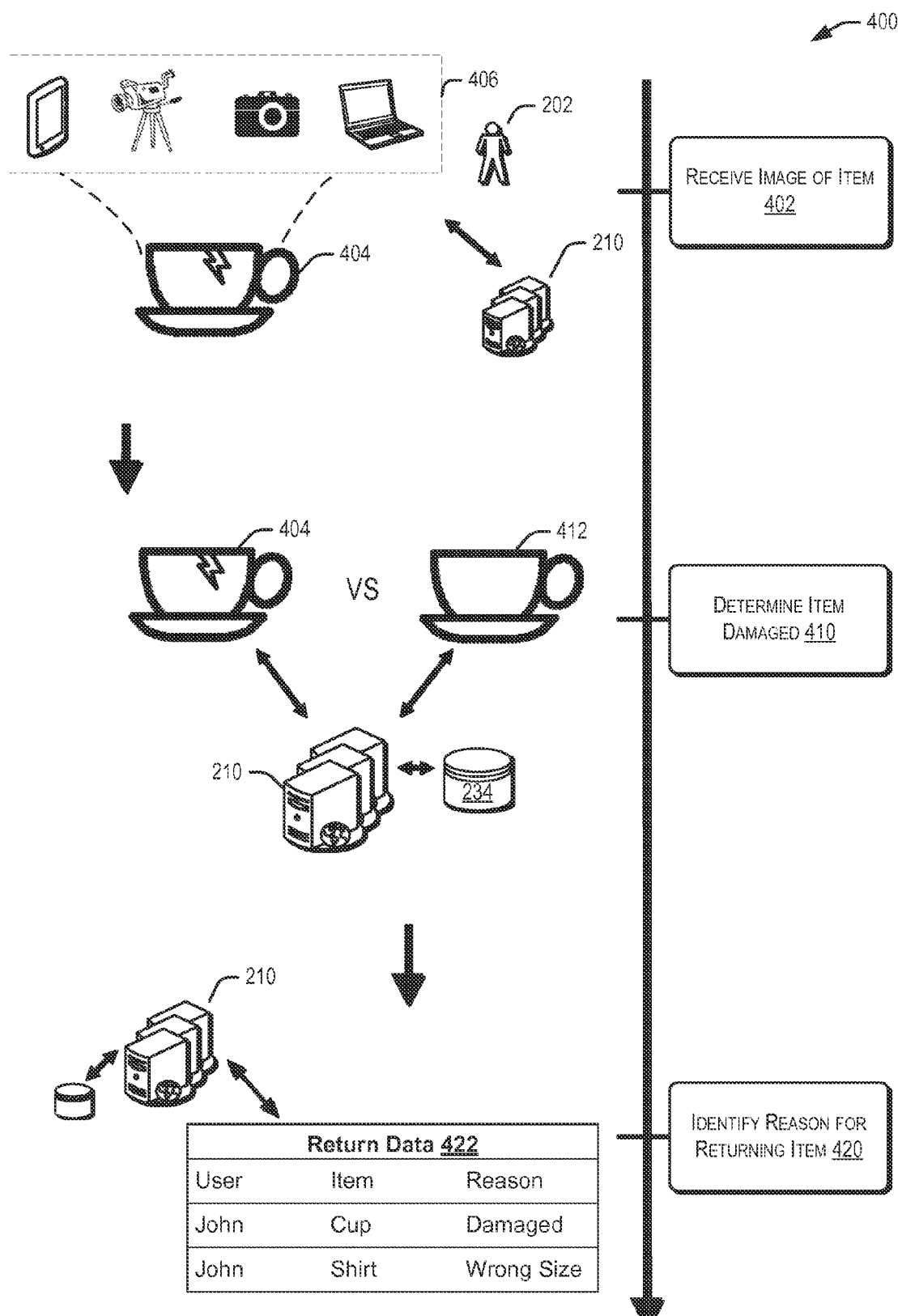
FIG. 4 illustrates an illustrative flow for managing a return request described herein, according to at least one example.

FIG. 4 illustrates an illustrative flow for managing a return request described herein, according to at least one example. In a non-limiting example, the method 400 can receive an image of an item 402. For example, the item 404 can be an item (e.g., shirt, pants, electronics, home goods) provided by an item provider to a user 202. The image may an image in various standards or image formats, including a Joint Photographic Expert Group (JPEG) standard, a portable network graphics (PNG) standard, graphic interchange format (GIF), bitmap (BMP) image format, or any other encoding and/or compression standards.

One or more user devices 406 may be used to capture an image of the item 404. For example, the user device 406 can be any type of computing device including a mobile phone, a smart phone, a personal digital assistant (PDA), a laptop computer, a desktop computer, a thin-client device, a tablet PC, an electronic book (e-book) reader, camera, motion picture device, scanner, etc. In another example, the computing device can be an image recognition device with machine vision (e.g., eyeglasses with a camera, automobile camera, mobile phone with camera, etc.). The image can be transmitted to a return management computers 210, such that the return management computers 210 is configured to receive the image from the device.

The return management computers 210 can determine an identifier for the image (e.g., characteristic included in the image, barcode, item identifier). In some examples, the return management computers 210 can identify the identifier for the image through the use of a stock image. For example, when the return management computers 210 compares one or more stock images to the received image, and identifies one or more shared characteristics between the two images, the return management computers 210 can determine the identifier for the received image is the same or substantially the same as the identifier for the stock image.

The image may include at least a portion of the item that identifies damage. For example, the image can show chipped glass, torn pages, missing button, broken zipper, discolored plastic or other examples of damage. The return management computers 210 can identify the damage through the use of a stock image. For example, when the stock image is compared with the received image, and identifies one or more differences between the two images, the return management computers 210 can determine that the item in the received image is damaged.

The method 400 can determine that the item is damaged 410. For example, the determination can be based at least in part on the identification whether the received image identifies that the item is damaged. In some examples, the received image 404 can be compared with the stock image 412. The return management computers 210 can identify the damage of the item by any distinctions between the stock image 412 and the received image 404, including the chipped glass, torn pages, missing button, broken zipper, discolored plastic or other examples of damage. The return management computers 210 may then determine, if the received image identifies that the item is damaged, whether a user that provided the image is requesting to return the item independent of receiving a request to return the item.

The method 400 can identify a reason for returning the item 420. For example, when the item identified in the received image is identified as damaged, the reason for the return may be listed as "damage." In some examples, the reasons for return can be saved in a return data store 422 and/or updated or maintained by the return management computers 210. The return data store 422 may also include reasons for returning items other than damage, including wrong size, not as expected, wrong specifications, and the like.

In some examples, a return workflow may be initiated. For example, the return workflow may be initiated for the item if it is determined that the user that provided the image is requesting to return the item (e.g., including shipping destination(s), time(s) for pickup, shipping carrier(s)).

Figure 5:
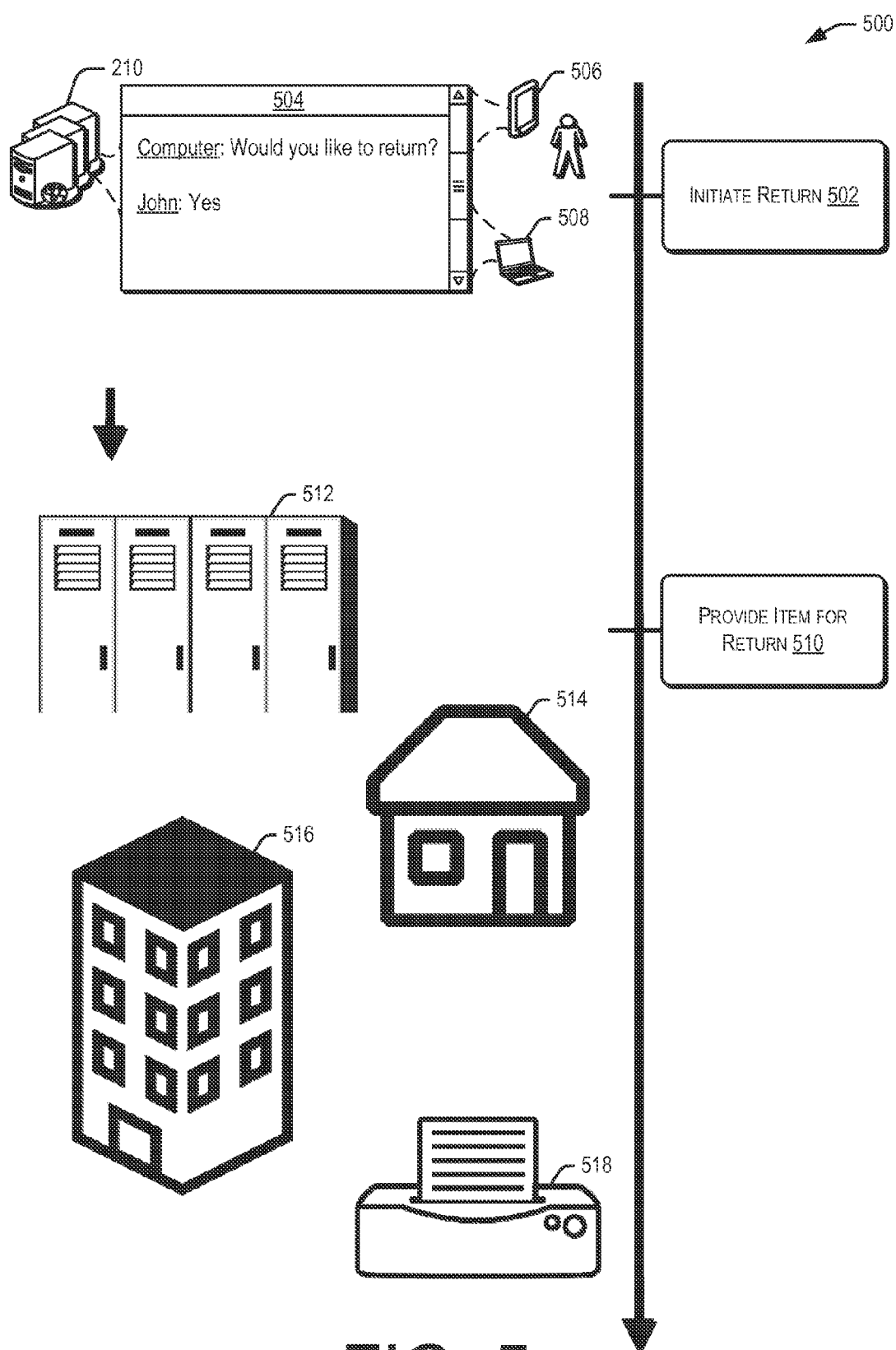
FIG. 5 illustrates an illustrative flow for managing a return request described herein, according to at least one example.

FIG. 5 illustrates an illustrative flow for managing a return request described herein, according to at least one example. The method 500 can initiate a return 502. The return management computers 210 can query 504 the user at one or more user devices 506, 508 whether the user would like to return the item. The user may confirm the request or provide an electronic notification of the intent to return the item.

The method 500 can include providing the item for return 510. For example, the user may visit one or more suggested return locations from the return management computers 210 or provide the item to a different return location that was not included in the one or more suggested return locations. As shown, the return locations can be based in part on the user's preferences, availability of the return location, a travel pattern of the user, or other factors.

The return locations can include a locker 512. The locker 512 can be an unmanned location that the user can access and leave the item for someone to pick up at a later time. In some embodiments, the locker 512 can include a scanner, near field communication (NFC) device, or other method that the user can use to identify the user, item, return request, item provider, workflow, or other information at the locker 512 (e.g., the user can scan a barcode from their user device at the scanner to identify that the user previous initiating a return and would like to drop off the item at the return location). Once the item is provided to the locker, a notification can be transmitted (e.g., to a shipping entity) to pick up the item from the locker 512 and provide the item to the item provider and/or third party.

The return locations can also include the user's home location(s) 514. In terms of a travel pattern, the home location may correspond with a first or second location identified by the travel pattern and/or the estimated time that the user may be at that location (e.g., time-location pair). The home location(s) 514 can include an area to drop off the item (e.g., porch, mailbox, concierge) so that when the item is provided to the location, a notification can be transmitted (e.g., to a shipping entity) to pick up the item from the home location(s) 514 and provide the item to the item provider and/or third party.

The return locations can also include one or more non-home locations 516. The non-home location(s) 516 can include a user's work, childcare, school, shopping, meeting locations, gym, friends' homes, or other standardly frequented locations by the user and/or the estimated time that the user may be at that location (e.g., time-location pair). In some examples, the one or more non-home locations 516 can include a commercial location (e.g., Starbucks®, 7-Eleven®, Fed-Ex®, UPS®, United States Postal Service location). The non-home location(s) 516 can also include an area to drop off the item (e.g., service area, mailbox, customer service desk) so that when the item is provided to the location, a notification can be transmitted (e.g., to a shipping entity) to pick up the item from the one or more non-home locations 516 and provide the item to the item provider and/or third party. In some examples, the shipping entity may not be notified of the provided item (e.g., because the shipping entity frequently gathers items from the return location and a particular interval).

The return locations can also include supplies 518 or amenities to help the user return the item to an item provider. For example, a user may not own a printer. The user may be able to initiate a return via the user device (e.g., taking an image of the item with a mobile device) and provide the item to the return location without a shipping label or shipping box. The return location can provide the supplies 518 to return the item (e.g., printer to print a shipping label, box to package the item for shipping).

Figure 6:
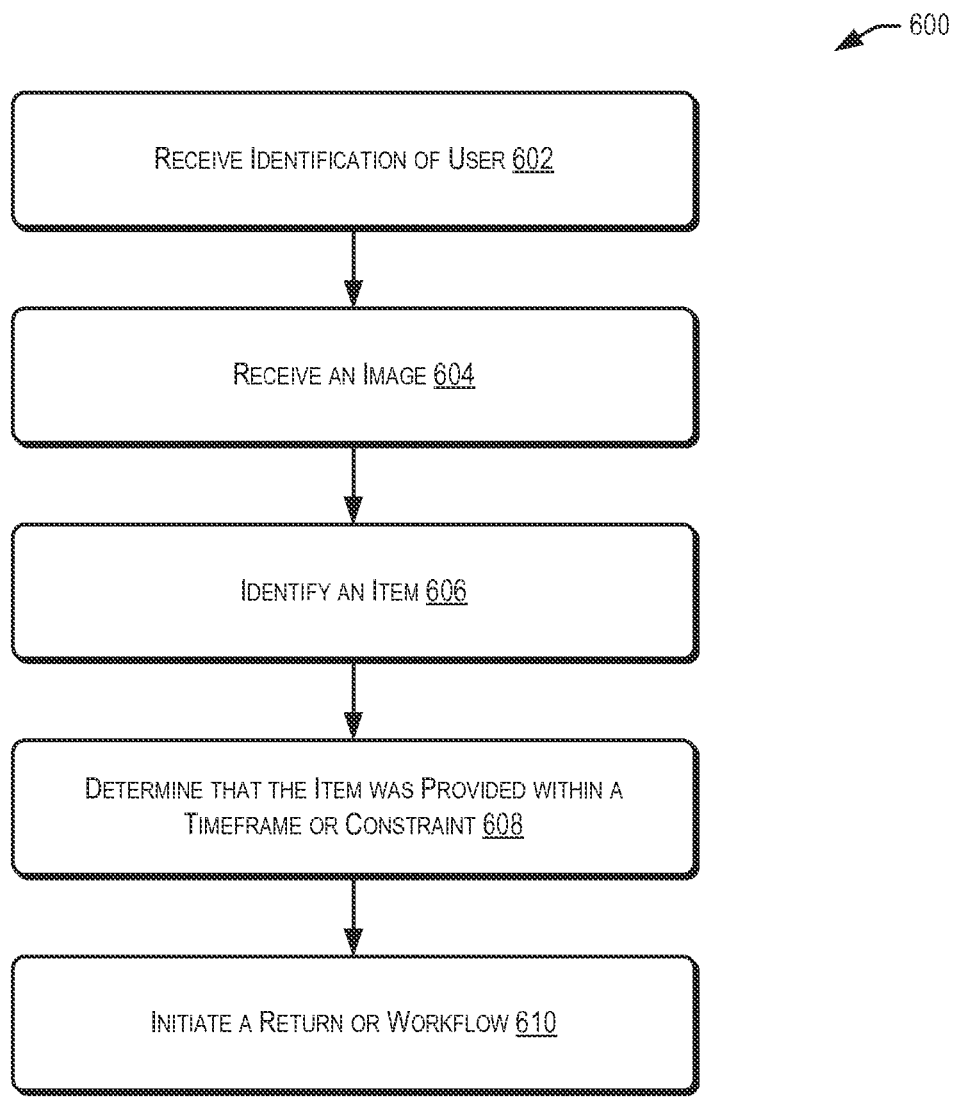
FIG. 6 illustrates an example flow diagram for managing a return request described herein, according to at least one example.

FIG. 6 illustrates an example flow diagram for managing a return request described herein, according to at least one example. In some examples, the one or more return management computers 210 (e.g., utilizing at least one of the order history module 236, the image analysis module 238, the return location module 240, the user module 242, the item analysis module 244, and/or the return module 246) or one or more user devices 204 shown in FIG. 2 may perform the process 600 of FIG. 6. The process 600 may begin at 602 by receiving an identification of a user. For example, the user can be associated with an item. In some examples, the item may be associated with an electronic marketplace (e.g., provided, sold, obtained, offered, bid on). In some examples, the item may have been previously provided to the user by an item provider. At 604, the process 600 may include receiving an image. For example, the image may be received from the user. In some examples, the image can include an identifier of at least a portion of the item (e.g., a characteristic of the item, a barcode associated with the item). At 606, the process 600 may include identifying an item. For example, the identification may be based at least in part on the identifier included in the image. At 608, the process 600 may include determining that the item was provided within a timeframe or a constraint. The timeframe may be an allowable timeframe determined by the item provider. In some examples, the timeframe may be an allowable timeframe for returning the item to the item provider. In some examples, if it is determined that the item was provided to the user within the allowable timeframe, the determination may include a determination that the user is initiating a return of the item to the item provider independent of receiving a request from the user to return the item. The constraint may be any constraint, including whether the request to return the item satisfies some constraint for returning the item (e.g., the user agrees to surrender the item in exchange for another item, if the item is returnable based on cost, or the return satisfies particular constraints associated with returning the item in a certain geography or constraints imposed by the item provider, etc.). Further in some examples, the process 600 may end at 610, where the process 600 may include initiating a return or a workflow. For example, the workflow may help enable the return of the item based at least in part on the determination that the user is initiating the return of the item. In some examples, the workflow may include determining a shipping destination and providing the shipping destination (e.g., to the user, to the item provider). In some examples, the workflow includes updating inventory information that identifies the item.

Figure 7:
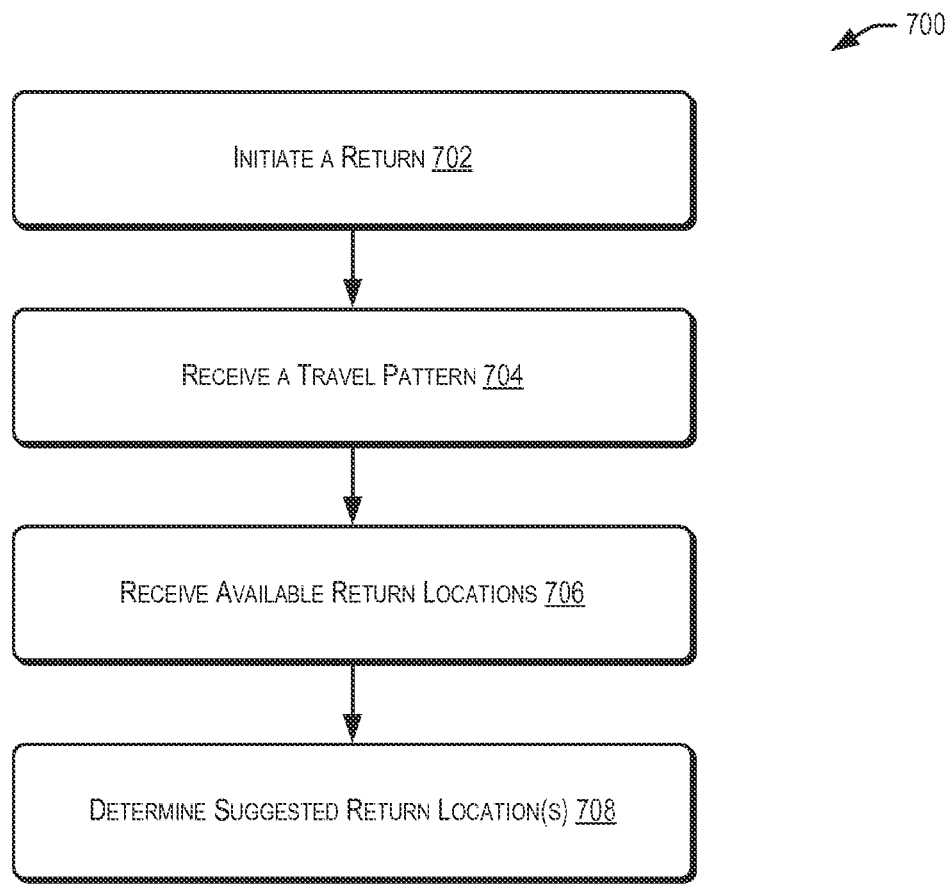
FIG. 7 illustrates an example flow diagram for managing a return request described herein, according to at least one example.

FIG. 7 illustrates an example flow diagram for managing a return request described herein, according to at least one example. In some examples, the one or more return management computers 210 (e.g., utilizing at least one of the order history module 236, the image analysis module 238, the return location module 240, the user module 242, the item analysis module 244, and/or the return module 246) or one or more user devices 204 shown in FIG. 2 may perform the process 700 of FIG. 7. The process 700 may begin at 702 by initiating a return. For example, the initiation of the return may include initiating a return request to return an item to an item provider. At 704, the process 700 may include receiving a travel pattern. For example, the travel pattern may be associated with a user that received the item (e.g., from an item provider). At 706, the process 700 may include receiving available return locations. Further in some examples, the process 700 may end at 708, where the process 700 may include determining a suggested return location(s). For example, the suggested return location(s) may include available return locations based at least in part on the travel pattern. In some examples, the suggested return location(s) can be configured to accept the item for return.

Figure 8:
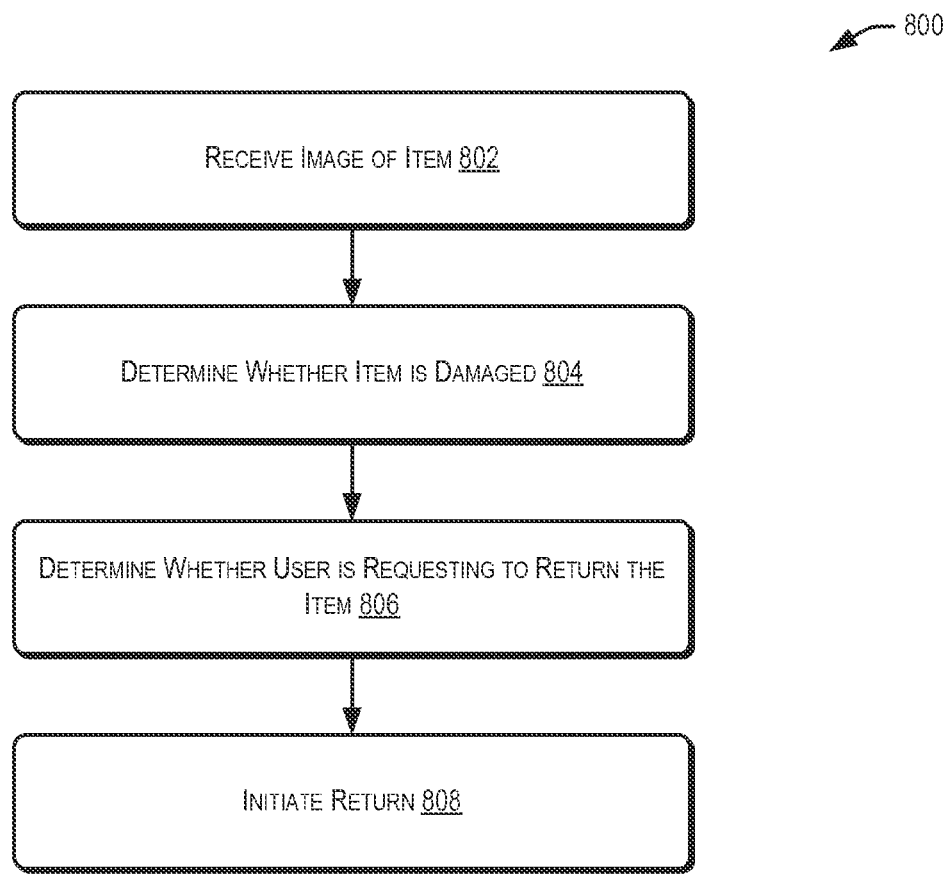
FIG. 8 illustrates an example flow diagram for managing a return request described herein, according to at least one example.

FIG. 8 illustrates an example flow diagram for managing a return request described herein, according to at least one example. In some examples, the one or more return management computers 210 (e.g., utilizing at least one of the order history module 236, the image analysis module 238, the return location module 240, the user module 242, the item analysis module 244, and/or the return module 246) or one or more user devices 204 shown in FIG. 2 may perform the process 800 of FIG. 8. The process 800 may begin at 802 by receiving an image of an item. For example, the image may include an identifier of at least a portion of the item. At 804, the process 800 may include determining whether the item was damaged. For example, the determination may be based at least in part on the identifier. At 806, the process 800 may include determining whether the user is requesting to return the item. For example, if the received image identifies that the item is damaged, the determination can determine that the user is returning the item because the item is damaged. In some examples, the determination to return the item can be independent of receiving a request to return the item. Further in some examples, the process 800 may end at 808, where the process 800 may include initiating a return. For example, return may include a return workflow for the item if it is determined that the user that provided the image is requesting to return the item.

Illustrative methods and systems for providing image analysis/management are described above. Some or all of these systems and methods may, but need not, be implemented at least partially by architectures such as those shown at least in FIGS. 1-8 above.

Figure 9:
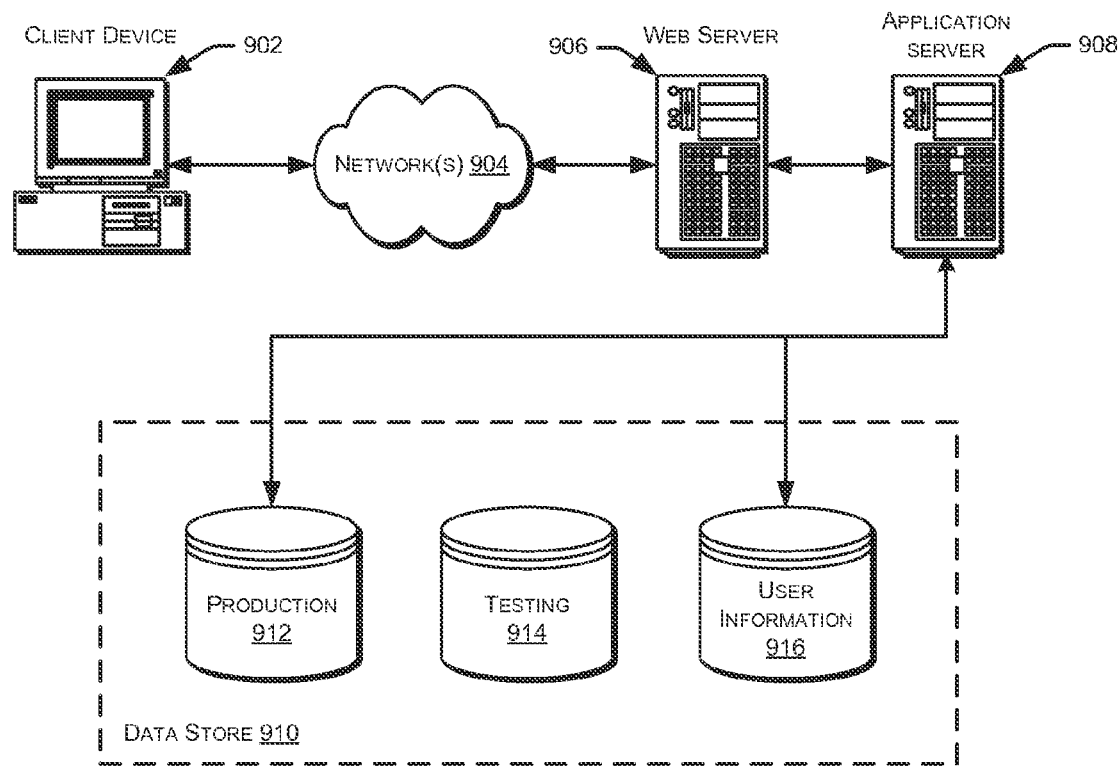
FIG. 9 illustrates an environment in which various embodiments of managing a return request described herein can be implemented, according to at least one example.

FIG. 9 illustrates aspects of an example environment 900 for implementing aspects in accordance with various embodiments. As will be appreciated, although a Web-based environment is used for purposes of explanation, different environments may be used, as appropriate, to implement various embodiments. The environment includes an electronic client device 902, which can include any appropriate device operable to send and receive requests, messages, or information over an appropriate network 904 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, and/or retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 902 and the application server 908, can be handled by the Web server. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log data 914, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a web page that the user is able to view via a browser on the user device 902. Information for a particular item of interest can be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature, and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk®. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, Visual C#® or C++, or any scripting language, such as Perl, Python or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer-readable media for containing code, or portions of code, can include any appropriate media known or used in the art, including storage media and communication media, such as but not limited to volatile and non-volatile, removable and non-removable media implemented in any method or technology for storage and/or transmission of information such as computer-readable instructions, data structures, program modules or other data, including RAM, ROM, EEPROM, flash memory or other memory technology, CD-ROM, DVD, or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as that included in the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, and/or at least one of Z in order for each to be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    receiving, by a computer system that implements an electronic marketplace, an identification of a user associated with an item of the electronic marketplace, the item having been previously provided to the user by an item provider;
    receiving, by the computer system and from a device of the user, a digital image that comprises an identifier of the item via a first communication channel of a communication network, the communication network enabling communications between the device of the user and the computer system, the digital image being generated using an encoding or compression standard implemented by the device of the user, and the first communication channel comprising a function call or a network document request;
    identifying, by the computer system, the item by comparing the identifier in the digital image of the item with identifiers of stored images of the item;
    determining, by the computer system, that the digital image was received from the user over the communication network within an allowable timeframe for returning the item to the item provider;
    when the item is identified and the digital image is received, initiating a return request confirmation, comprising:
        transmitting, via a second communication channel, a return query text message to the device of the user, the second communication channel comprising a short message service; and
        receiving, via the second communication channel, a return confirmation text message; and
    initiating a workflow for enabling the return of the item based on the-return confirmation text message.

2. The computer-implemented method of claim 1, wherein initiating the workflow includes:
  identifying a shipping destination; and
  providing shipping information, the shipping information including the identified shipping destination.

3. The computer-implemented method of claim 1, wherein initiating the workflow includes updating inventory information that identifies the item.

4. The computer-implemented method of claim 1, wherein the digital image includes a characteristic of the item that is identifiable in the digital image.

5. The method of claim 1, wherein the workflow comprises:
  identifying one or more suggested return locations or shipping destinations; and
  transmitting information that identifies the one or more suggested return locations or the shipping destination to the device of the user.

6. The method of claim 1, further comprising:
  before initiating the workflow for enabling the return of the item, determining a cost of the item;
  determining that the cost of the item fails to satisfy a constraint associated with returning the item; and
  transmitting a communication to the device of the user during the workflow, the communication including a denial of the return of the item, but initiating a refund for the item.

7. A computer-implemented method, comprising:
  receiving, by a computer system and from a device of a user, a digital image that comprises an identifier of an item via a first communication channel of a network connection, the network connection enabling communications between the device of the user and the computer system, the digital image being generated using an encoding or compression standard implemented by the device of the user, and the first communication channel comprising a function call or a network document request;
  identifying, by the computer system, the item by comparing the identifier in the digital image of the item with identifiers of stored images of the item;
  determining, by the computer system, that the item satisfies a constraint for a return of the item based on receiving the digital image of the item via the network connection;
  when the item is identified, initiating a return request confirmation, comprising:
    transmitting, via a second communication channel, a return query text message to the device of the user, the second communication channel comprising a short message service; and
    receiving, via the second communication channel, a return confirmation text message; and
  initiating a return workflow for the item based on the return confirmation text message.

8. The computer-implemented method of claim 7, wherein the constraint is an allowable timeframe for returning the item or identification of whether the item is returnable.

9. The computer-implemented method of claim 8, further comprising determining that the digital image was received from the user within the allowable timeframe for returning the item.

10. The computer-implemented method of claim 7, further comprising determining a shipping destination in response to initiating the return workflow.

11. The computer-implemented method of claim 7, further comprising:
  before determining that the item should be returned to an item provider, comparing at least a portion of a stock image with the digital image;
  determining a dimension of the item identified with the digital image from the comparison with the stock image; and
  storing the dimension for the item.

12. A system, comprising:
  a memory that stores computer-executable instructions; and
  a processor configured to access the memory, wherein the processor is configured to execute the computer-executable instructions to collectively at least:
    receive a digital image of an item from a user device via a first communication channel, the first communication channel comprising a function call or a network document request, the digital image comprising an identifier of the item;
    identify the item by comparing the identifier in the digital image with identifiers of stored images of the item;
    determine that the digital image was received from the user device within an allowable timeframe for returning the item to an item provider;
    when the item is identified, initiate a return request confirmation, comprising:
      transmitting, via a second communication channel, a return query text message to the user device, the second communication channel comprising a short message service; and
      receiving, via the second communication channel, a return confirmation text message; and
    initiate a return workflow for the item based at least in part on the return confirmation text message.

13. The system of claim 12, further comprising determining whether the digital image was received from the user device within an allowable timeframe for returning the item to the item provider.

14. The system of claim 12, further comprising:
  identify a barcode in the digital image; and
  store information associated with the barcode with the item.

15. The system of claim 12, wherein the processor is further configured to execute the computer-executable instructions to collectively at least:
  determine a year of manufacture or origin of manufacture associated with the stored images of the item; and
  store, for the item in a data store, the year of manufacture or the origin of manufacture associated with the stored images of the item.

* * * * *